US009967194B2

(12) United States Patent
Morimoto et al.

(10) Patent No.: US 9,967,194 B2
(45) Date of Patent: May 8, 2018

(54) NETWORK CONTROL SYSTEM, CONTROL DEVICE, NETWORK INFORMATION MANAGEMENT METHOD, AND STORAGE

(71) Applicant: NEC CORPORATION, Tokyo (JP)

(72) Inventors: Masaharu Morimoto, Tokyo (JP); Kazuya Suzuki, Tokyo (JP); Yohei Iizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days. days.

(21) Appl. No.: 15/521,735

(22) PCT Filed: Oct. 29, 2015

(86) PCT No.: PCT/JP2015/080560
§ 371 (c)(1),
(2) Date: Apr. 25, 2017

(87) PCT Pub. No.: WO2016/068238
PCT Pub. Date: May 6, 2016

(65) Prior Publication Data
US 2017/0310597 A1 Oct. 26, 2017

(30) Foreign Application Priority Data

Oct. 30, 2014 (JP) ................................ 2014-221235

(51) Int. Cl.
*H04L 25/34* (2006.01)
*H04L 25/49* (2006.01)
(Continued)

(52) U.S. Cl.
CPC .......... *H04L 47/196* (2013.01); *H04L 45/245* (2013.01); *H04L 49/602* (2013.01); *G06F 17/00* (2013.01); *H04L 43/00* (2013.01)

(58) Field of Classification Search
CPC combination set(s) only.
See application file for complete search history.

(56) References Cited

U.S. PATENT DOCUMENTS

| 5,935,262 A * | 8/1999 | Barrett | H04L 43/00 714/46 |
| 2005/0270986 A1* | 12/2005 | Watanabe | H04L 41/12 370/252 |
| 2015/0249565 A1* | 9/2015 | Yamabe | H04L 41/044 370/254 |

FOREIGN PATENT DOCUMENTS

| JP | 2002-084280 A | 3/2002 |
| JP | 2005-348051 A | 12/2005 |

(Continued)

OTHER PUBLICATIONS

Yohei Iizawa, et al., "Multilayer Abstraction Technology for Realizing Heterogeneous Network Integrated Control Architecture", NEC SDN Solutions, Feb. 1, 2014, pp. 44 to 47, vol. 66, No. 2.

(Continued)

*Primary Examiner* — Wednel Cadeau
(74) *Attorney, Agent, or Firm* — Sughrue Mion, PLLC

(57) ABSTRACT

The objective of the invention is to enable sharing, between layers in a network in which the layers are used to perform communications, resource information and information required for using paths. A network control system includes: a lower layer information storage unit, a lower layer control information conversion unit, an upper layer information storage unit, an upper layer control information conversion unit, an integrated layer information storage unit and a layer integration unit. The layer integration unit integrates, as virtual links, the information of flows, which are representative of communications among terminals in the lower layer, with the network information of the upper layer, thereby constituting the network information of the integrated layer. Further, the layer integration unit performs reciprocal exchanges of network information among the integrated layer information storage unit, the lower layer information storage unit and the upper layer information storage unit and the upper layer information (Continued)

storage unit, said reciprocal exchanges including a process of giving, as the attribute information of the ports of the upper layer, label information required for using the virtual link provided by the lower layer.

18 Claims, 12 Drawing Sheets

(51) Int. Cl.
*H04L 12/801* (2013.01)
*H04L 12/931* (2013.01)
*H04L 12/709* (2013.01)
*G06F 17/00* (2006.01)
*H04L 12/26* (2006.01)

(56) References Cited

FOREIGN PATENT DOCUMENTS

| | | |
|---|---|---|
| JP | 2012-119999 A | 6/2012 |
| JP | 2013-157855 A | 8/2013 |

OTHER PUBLICATIONS

International Search Report for PCT/JP2015/080560 dated Dec. 1, 2015 [PCT/ISA/210].
Written Opinion for PCT/JP2015/080560 dated Dec. 1, 2015 [PCT/ISA/237.

* cited by examiner

Fig. 10

| NodeID | PortID | Label | VIRTUAL PORT ID |
|---|---|---|---|
| Node1 | Port10 | Vlan10 | Vport2 |
| Node1 | Port10 | Vlan 20 | Vport3 |
| Node1 | Port10 | Mpls 100 | Vport4 |
| ... | ... | ... | ... |
| Node2 | Port11 | Vlan10 | Vport6 |
| Node2 | Port11 | Vlan 20 | Vport7 |
| Node2 | Port11 | Mpls 100 | Vport8 |
| ... | ... | ... | ... |

Fig. 11

| Match | Action | Path |
|---|---|---|
| In_node: node1, In_port: port1 | Output: node2, port5 | link10 |

| # | Match | Action | Path |
|---|---|---|---|
| 1 | In_node: node1 In_port: port1 | Output: vport2 | |
| 2 | In_node: node2 In_port: vport6 | Output: port5 | |

Fig. 12

Node1, Table: 1

| # | Match | Action | Path |
|---|---|---|---|
| 1 | in_port: port1 | Write Metadata 10<br>Goto Table 2 | |

Node1, Table: 2

| # | Match | Action | Path |
|---|---|---|---|
| 1 | metadata: 10 | push vlan 10<br>output port10 | |

Node2, Table: 1

| # | Match | Action | Path |
|---|---|---|---|
| 1 | in_port: vport11<br>vlan_id: 10 | Write Metadata 10<br>Goto Table 2 | |

Node2, Table: 2

| # | Match | Action | Path |
|---|---|---|---|
| 1 | metadata: 10 | pop vlan<br>output port5 | |

NETWORK CONTROL SYSTEM, CONTROL DEVICE, NETWORK INFORMATION MANAGEMENT METHOD, AND STORAGE

CROSS REFERENCE TO RELATED APPLICATIONS

This application is a National Stage of International Application No. PCT/JP2015/080560 filed Oct. 29, 2015, claiming priority based on Japanese Patent Application No. 2014-221235 filed Oct. 30, 2014, the contents of all of which are incorporated herein by reference in their entirety.

TECHNICAL FIELD

Description of Related Application

The present invention is based upon and claims the benefit of priority from Japanese Patent Application No. 2014-221235, filed on Oct. 30, 2014, and the entire contents stated in the application are incorporated herein by reference.

The present invention relates to a network control system, a control device, a network information management method, and a program, and particularly relates to a network control system, a control device, a network information management method, and a program for performing communication by using a plurality of layers.

BACKGROUND ART

PTL 1 describes an example of a system for controlling a multilayer network. A policy-based communication management system in PTL 1 includes, in each layer of a communication network constituted of a plurality of access networks and a core network: a means that stores a management policy; and a policy management means that manages a layer in accordance with the management policy. Further, in the policy-based communication management system, the policy management means searches for the management policy upon occurrence of an event on a layer. The policy management means includes: a means that issues an action request to a policy management means on a server layer while assuming that the own layer serves as a client and the other layer serves as the server layer, when an action of a management policy matching with a condition of the event is not an action of the own layer. The policy management means further includes: a means that returns a response to an action request to a policy management means on a client layer, when the action is not an action of the own layer as a result of searching for the management policy by the policy management means having received the action request as a server layer. The policy management means further includes: a means that performs policy management in accordance with the management policy of the own layer, when being notified of an execution result of an action request from the other layer.

PTL 2 discloses a virtual network connection device that is expected to be able to facilitate setting work in connecting two virtual networks. PTL 2 discloses a method of copying mapping information indicating a correspondence relationship of a virtual link between two virtual networks and physical interface information associated with the virtual link and rewriting the mapping information as needed. The method thereby facilitates setting of a control device controlling a virtual network to be connected.

CITATION LIST

Patent Literature

PTL 1: Japanese Unexamined Patent Application Publication No. 2002-84280
PTL 2: Japanese Unexamined Patent Application Publication No. 2013-157855

SUMMARY OF INVENTION

Technical Problem

The following analysis is given according to the present invention. A first problem in PTL 1 is that there is not disclosed means that knows resource information on a certain layer from another layer. This is because the policy-based communication management system in PTL 1 implements control of each layer as a policy and performs inter-layer linkage in a form of request and response for policy application.

In addition, a second problem in PTL 1 is that there is not disclosed handover of label information necessary in using a new path generated on a lower layer. In general, a network is constituted of various devices and a control means varies for each layer and each domain. Thus, label information for using a path provided by a lower layer also varies. Without means of sharing this information, a method of using a path of a lower layer is unknown from an upper layer, and inter-layer linkage and automatization thereof are almost impossible.

An object of the present invention is to provide a network control system, a control device, a network information management method, and a program that can contribute to sharing inter-layer resource information and information necessary for using a path in a network for performing communication using a plurality of layers.

Solution to Problem

According to a first aspect, provided is a network control system. The system includes: lower layer data transfer unit that performs communication of a lower layer; a lower layer information storage unit that stores network information of the lower layer; a lower layer control information conversion unit that updates, based on network information in the lower layer information storage unit and a setting and a status of the lower layer data transfer unit, network information in the lower layer information storage unit and a setting and a status of the lower layer data transfer unit; an upper layer data transfer unit that performs communication of an upper layer; an upper layer information storage unit that stores network information of the upper layer; an upper layer control information conversion unit that updates, based on network information in the upper layer information storage unit and a setting and a status of a switch for an upper layer, network information in the upper layer information storage unit and a setting and a status of the upper layer data transfer unit; an integrated layer information storage unit that stores network information of an integrated layer obtained by integrating network information of the lower layer with network information of the upper layer; and a layer integration unit that configures network information of the integrated layer by integrating network information of the upper layer with information on a flow representing point-to-point communication of the lower layer as a virtual link, and performs reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer.

According to a second aspect, provided is a control device connected with a lower layer data transfer unit that performs communication of a lower layer and an upper layer data transfer unit that performs communication of an upper layer. The device includes: a lower layer data transfer unit that performs communication of the lower layer; a lower layer information storage unit that stores network information of the lower layer; a lower layer control information conversion unit that updates, based on network information in the lower layer information storage unit and a setting and a status of the lower layer data transfer unit, network information in the lower layer information storage unit and a setting and a status of the lower layer data transfer unit; an upper layer data transfer unit that performs communication of the upper layer; an upper layer information storage unit that stores network information of the upper layer; an upper layer control information conversion unit that updates, based on network information in the upper layer information storage unit and a setting and a status of a switch for an upper layer, network information in the upper layer information storage unit and a setting and a status of the upper layer data transfer unit; an integrated layer information storage unit that stores network information of an integrated layer obtained by integrating network information of the lower layer with network information of the upper layer; and a layer integration unit that configures network information of the integrated layer by integrating network information of the upper layer with information on a flow representing point-to-point communication of the lower layer as a virtual link, and performs reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer.

According to a third aspect, provided is a network information management method, by a control device connected with a lower layer data transfer unit that performs communication of a lower layer and an upper layer data transfer unit that performs communication of an upper layer. The control device includes: a lower layer information storage unit that stores network information of the lower layer; a lower layer control information conversion unit that updates, based on network information in the lower layer information storage unit and a setting and a status of the lower layer data transfer unit, network information in the lower layer information storage unit and a setting and a status of the lower layer data transfer unit; an upper layer information storage unit that stores network information of the upper layer; an upper layer control information conversion unit that updates, based on network information in the upper layer information storage unit and a setting and a status of a switch for an upper layer, network information in the upper layer information storage unit and a setting and a status of the upper layer data transfer unit; and an integrated layer information storage unit that stores network information of an integrated layer obtained by integrating network information of the lower layer with network information of the upper layer.

The method includes steps of:

configuring network information of the integrated layer by integrating network information of the upper layer with information on a flow representing point-to-point communication of the lower layer as a virtual link; and performing reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer.

According to a fourth aspect, provided is a computer program executed by a control device, configured by a computer, connected with a lower layer data transfer unit that performs communication of a lower layer and an upper layer data transfer unit that performs communication of an upper layer. The computer includes: a lower layer information storage unit that stores network information of the lower layer; a lower layer control information conversion unit that updates, based on network information in the lower layer information storage unit and a setting and a status of the lower layer data transfer unit, network information in the lower layer information storage unit and a setting and a status of the lower layer data transfer unit; an upper layer information storage unit that stores network information of the upper layer; an upper layer control information conversion unit that updates, based on network information in the upper layer information storage unit and a setting and a status of a switch for an upper layer, network information in the upper layer information storage unit and a setting and a status of the upper layer data transfer unit; and an integrated layer information storage unit that stores network information of an integrated layer obtained by integrating network information of the lower layer with network information of the upper layer.

The program includes processes of:

configuring network information of the integrated layer by integrating network information of the upper layer with information on a flow representing point-to-point communication of the lower layer as a virtual link; and performing reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer. Note that the program may be recorded in a computer-readable (non-transient) storage medium. In other words, the present invention may be also embodied as a computer program product.

Advantageous Effects of Invention

The present invention makes it possible to contribute to sharing inter-layer resource information and information necessary for using a path in a network for performing communication using a plurality of layers. In other words, the present invention also intends to convert a network control system and a control device to include a function of integrated display through visualization with a more preferred mode.

BRIEF DESCRIPTION OF DRAWINGS

FIG. 10 is a diagram illustrating an example of attribute information of ports covered in the second example embodiment of the present invention;

FIG. 11 is a diagram illustrating an example of flow information to be stored in a network database for integrated layer (NWDB for integrated layer) according to the second example embodiment of the present invention; and FIG. 12 is a diagram illustrating an example of flow information set in an OpenFlow switch according to the second example embodiment of the present invention.

DESCRIPTION OF EMBODIMENTS

First Example Embodiment

Figure 1:
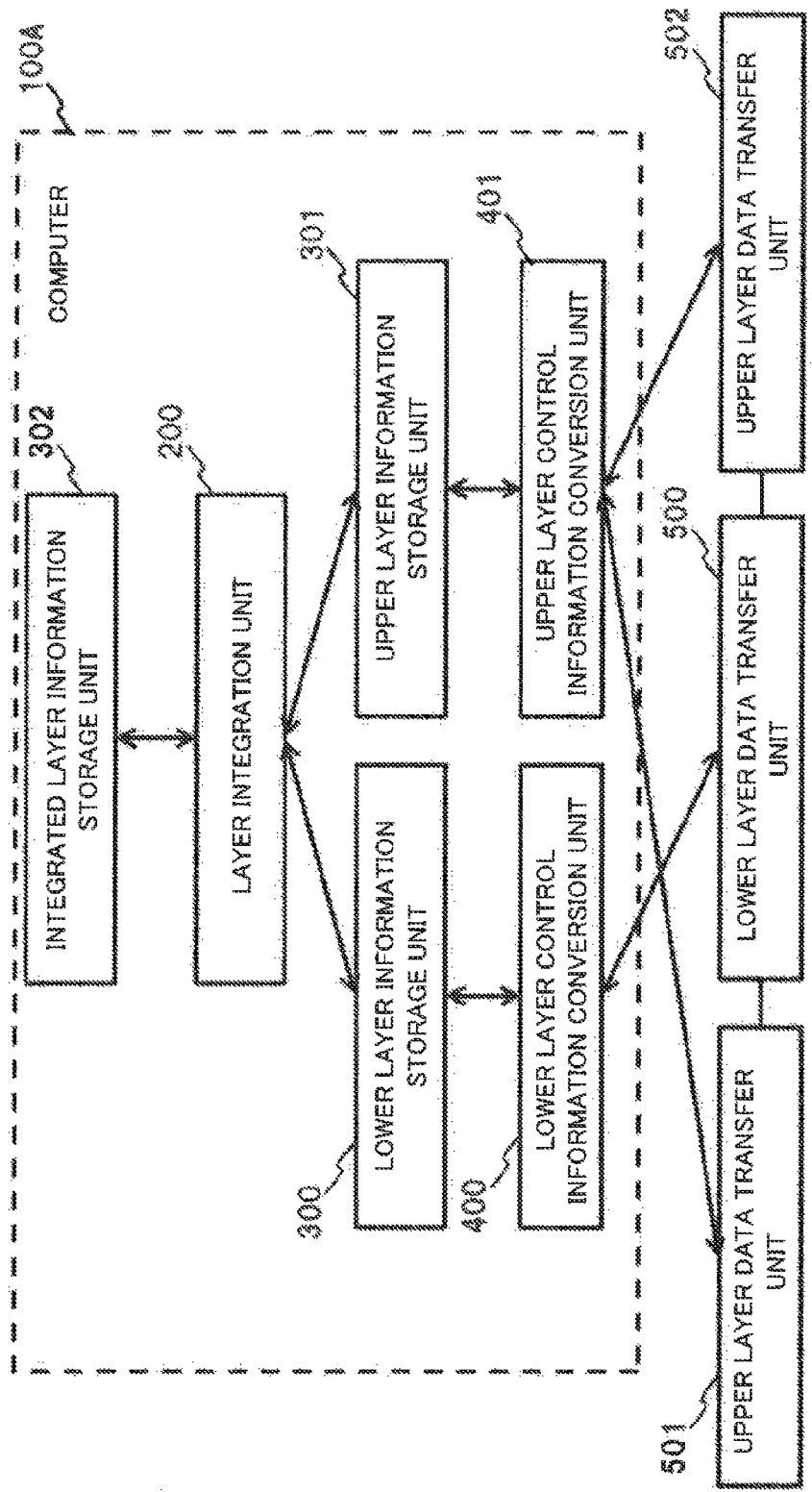
FIG. 1 is a diagram illustrating a configuration of a system according to a first example embodiment of the present invention.

Now, a first example embodiment of the present invention is described in detail with reference to the drawings. FIG. 1 is a diagram illustrating a configuration of a network control system according to the first example embodiment of the present invention. Referring to FIG. 1, a configuration is illustrated in which a computer 100A is connected with a lower layer data transfer unit 500 that performs communication of a lower layer and upper layer data transfer units 501 and 502 that each perform communication of an upper layer via the lower layer data transfer unit 500.

The computer 100A (central processing unit; processor; data processing device) includes an integrated layer information storage unit 302, a layer integration unit 200, a lower layer information storage unit 300, an upper layer information storage unit 301, a lower layer control information conversion unit 400, and an upper layer control information conversion unit 401.

The lower layer information storage unit 300 stores (holds) network information of a lower layer. The "network information of a lower layer" herein includes network topology information (hereinafter, referred to as "topology information") and flow information representing point-to-point communication. The topology information is described by using a connection relationship between nodes or ports, links, and the like of a lower layer. In addition, in the present example embodiment, the "network information of a lower layer" also includes information on some of packets flowing through a network, and attribute information of the packets. These pieces of the network information are registered by the lower layer control information conversion unit 400 to be described later, and may be registered and updated by a person, a program, or the like.

The lower layer control information conversion unit 400 acquires information relating to a setting and a status (hereinafter, "setting/status information") of the lower layer data transfer unit 500 under management of the own unit. The lower layer control information conversion unit 400 then converts the information into network information and stores the network information in the lower layer information storage unit 300. In addition, when storing (registration), updating, and deletion are performed at the lower layer information storage unit 300, the lower layer control information conversion unit 400 updates and controls a setting and a status of the lower layer data transfer unit 500 in accordance with a processing of the storing, updating, and deletion. For example, the lower layer control information conversion unit 400 detects, based on information collected from the lower layer data transfer unit 500, a change of network topology and updates topology information stored in the lower layer information storage unit 300. In addition, when flow information stored in the lower layer information storage unit 300 changes, the lower layer control information conversion unit 400 performs setting change and control on the lower layer data transfer unit 500 in accordance with the change of the flow information.

The upper layer information storage unit 301 stores network information of an upper layer. The "network information of an upper layer" herein includes topology information described by using a connection relationship between nodes or ports, and links of an upper layer, flow information representing point-to-point communication, information on some of packets flowing through a network, and the like. The flow information of an upper layer herein includes a match condition such as a port and a header, and an action such as an output destination (output port) of a flow conforming to the match condition and a content of header conversion. The flow information of an upper layer also includes link information (path information) through which a flow passes, and the like.

The upper layer control information conversion unit 401 acquires pieces of setting/status information from the upper layer data transfer units 501 and 502, converts the information into network information, and stores the network information in the upper layer information storage unit 301. In addition, when storing, updating, and deletion are performed at the upper layer information storage unit 301, the upper layer control information conversion unit 401 updates and controls settings and statuses of the upper layer data transfer units 501 and 502 in accordance with a processing of the storing, updating, and deletion.

The layer integration unit 200 performs a reciprocal exchange operation between a content of the integrated layer information storage unit 302 and pieces of network information in the lower layer information storage unit 300 and the upper layer information storage unit 301. Specifically, the layer integration unit 200 refers to pieces of information in the lower layer information storage unit 300 and the upper layer information storage unit 301. The layer integration unit 200 then integrates network information of an upper layer with flow information of a lower layer as a virtual link, and configures network information of an integrated layer. The configured network information is stored in the integrated layer information storage unit 302. In addition, the layer integration unit 200 stores virtual ports between nodes of an upper layer and information on the virtual link in association with each other as attribute information of the upper layer information storage unit 301. Further, the layer integration unit 200 decomposes flow information stored in the integrated layer information storage unit 302 into two or more flows as needed and stores the two or more flows in the upper layer information storage unit 301.

In addition, when configuring the network information of the integrated layer, the layer integration unit 200 refers to connection information (hereinafter, referred to as "boundary information") between a port of a lower layer and a port of an upper layer (see FIG. 8).

The lower layer data transfer unit 500 is configured by a switch or the like that transfers data in accordance with a transfer rule set by the lower layer control information conversion unit 400.

The upper layer data transfer units 501 and 502 each transfer data in accordance with a rule set by the upper layer control information conversion unit 401.

Note that each of the units (processing means) of the computer 100A illustrated in FIG. 1 can be also implemented by a computer program causing the computer 100A to execute each of the above-described processing using hardware of the computer 100A. In addition, in the example of FIG. 1, the processing means are arranged in the single computer 100A, but a plurality of computers can also be used to form a configuration equivalent to that of the computer 100A in FIG. 1. For example, it is also possible to employ a configuration in which different computers carrying functions equivalent to those of the layer integration unit 200, the lower layer control information conversion unit 400, and the upper layer control information conversion unit 401 are connected.

Now, an operation of the present example embodiment is described in detail with reference to the drawings. In the following description, it is assumed that network information at an initial state is set as follows. The lower layer information storage unit 300 stores a setting and a status of the lower layer data transfer unit 500 stored by the lower layer control information conversion unit 400. The upper layer information storage unit 301 holds settings and statuses of the upper layer data transfer units 501 and 502 stored by the upper layer control information conversion unit 401. In addition, the integrated layer information storage unit 302 stores topology information (before integration) stored by the upper layer information storage unit 301 (see FIG. 7(*a*)).

Figure 2:
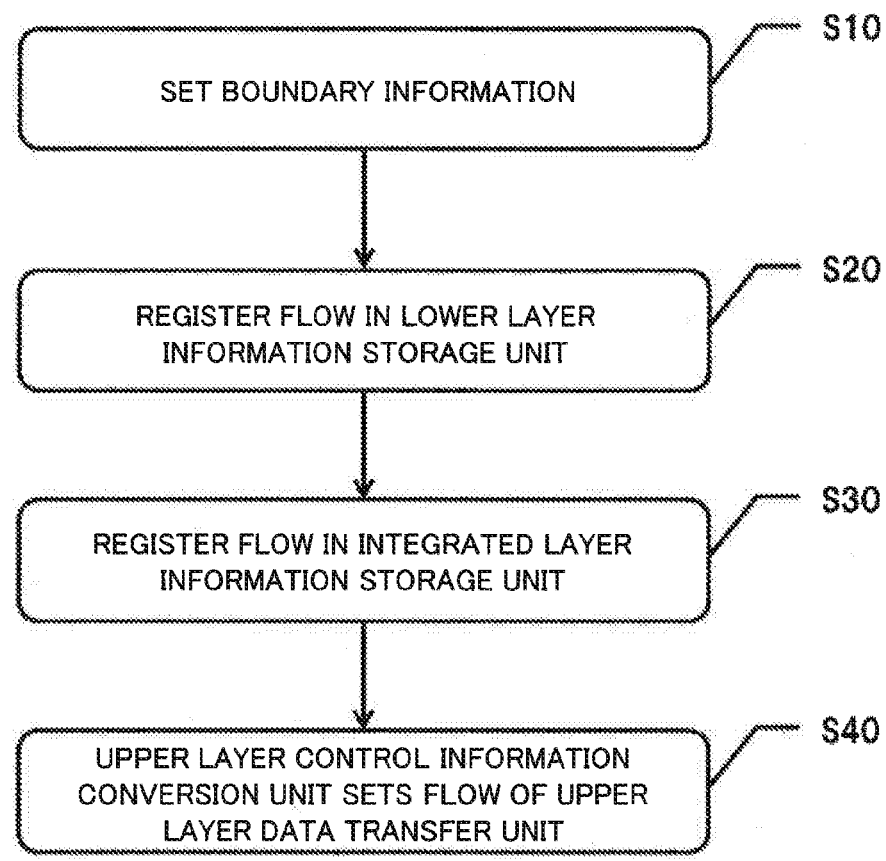
FIG. 2 is a flowchart representing an operation of the system according to the first example embodiment of the present invention.
Figure 3:
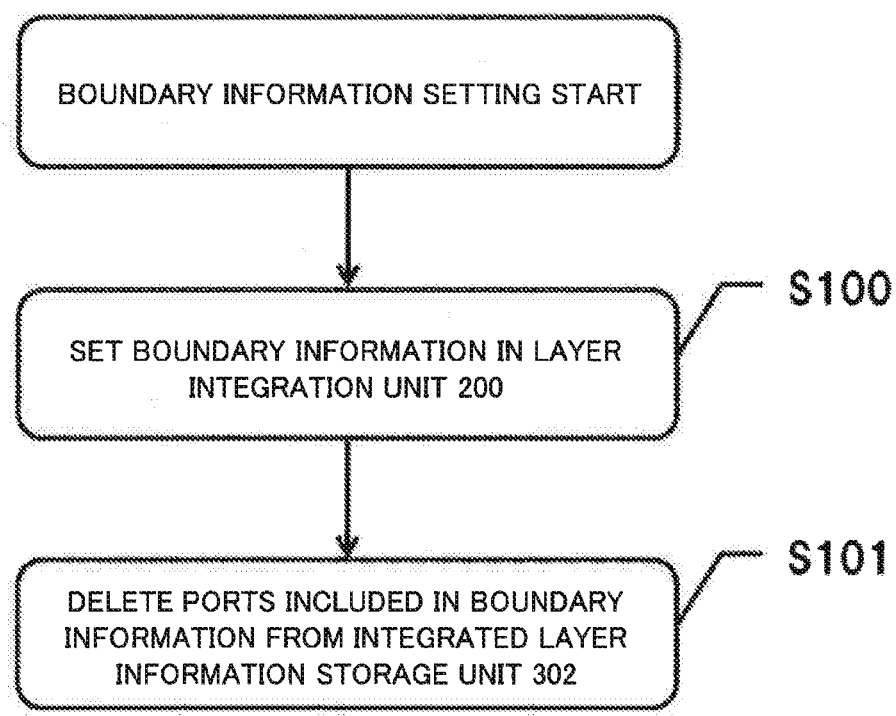
FIG. 3 is a flowchart representing an operation when the system according to the first example embodiment of the present invention accepts a setting of boundary information.

First, boundary information is input and set (S10 in FIG. 2). When boundary information is input and set, the layer integration unit 200 refers to the boundary information. The layer integration unit 200 then designates a plurality of sets of ports of respective layers, being at a boundary from among pieces of network information stored in the lower layer information storage unit 300 and the upper layer information storage unit 301 (S100 in FIG. 3). Next, the layer integration unit 200 deletes the designated ports included in the boundary information from topology information in the integrated layer information storage unit 302 (see S101 in FIG. 3, and FIG. 7(*b*)).

Next, a flow is stored in the lower layer information storage unit 300 (S20 in FIG. 2). When a flow is stored in the lower layer information storage unit 300 (S200 in FIG. 4), the layer integration unit 200 confirms whether or not an input port and an output port of the flow are included in the boundary information (S201 in FIG. 4). When an input port and an output port of the flow are not included in the boundary information (No at S201 in FIG. 4), the layer integration unit 200 regards the flow as normal flow storing and does not perform any particular operation. On the other hand, the lower layer information storage unit 300 notifies the lower layer control information conversion unit 400 of addition of the flow (S204 in FIG. 4). The lower layer control information conversion unit 400 controls the lower layer data transfer unit 500 in accordance with the notification.

Figure 4:
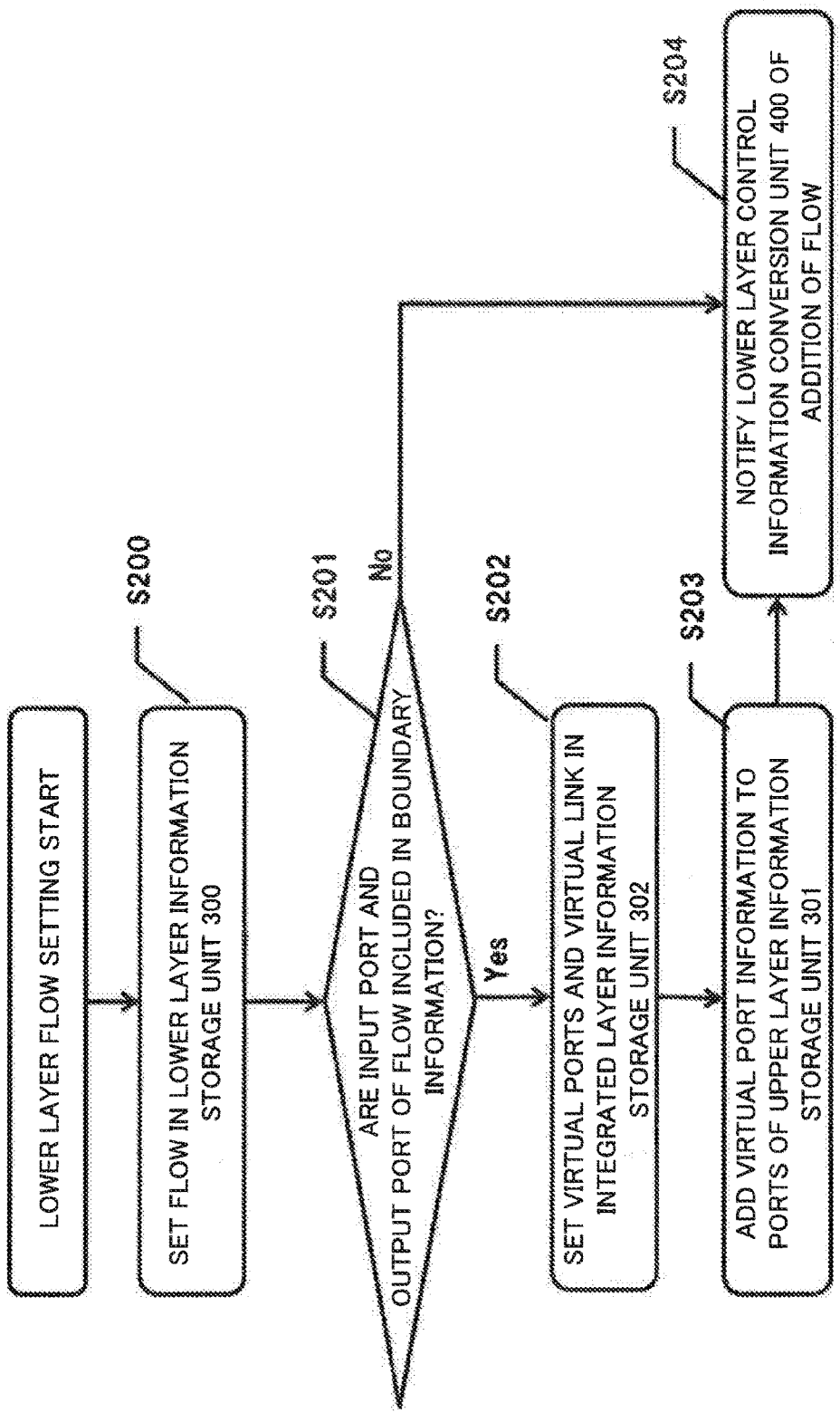
FIG. 4 is a flowchart representing an operation when the system according to the first example embodiment of the present invention accepts a setting of a flow of a lower layer.
Figure 7:
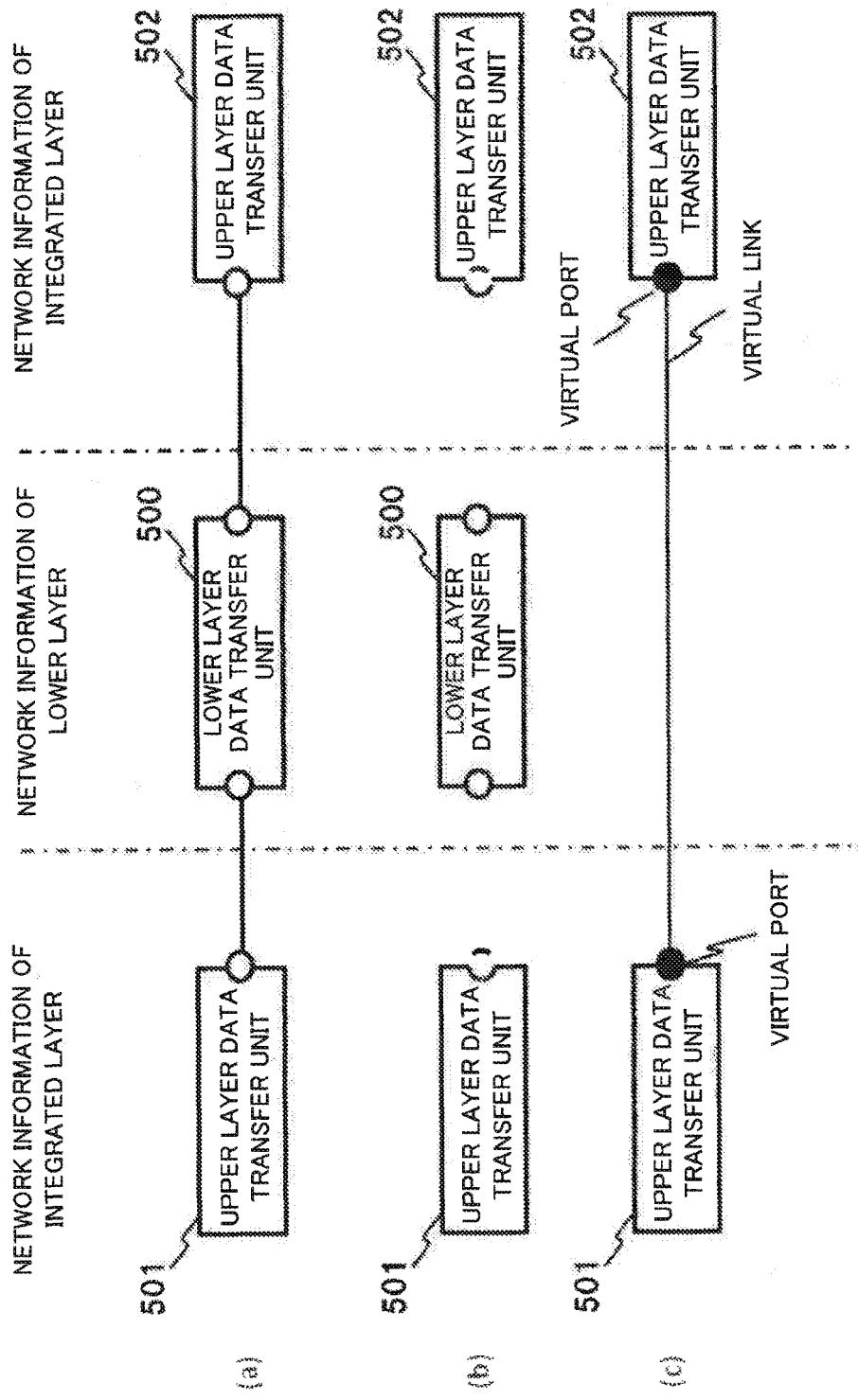
FIG. 7 is a diagram for describing a creation process of network information of the integrated layer to be created by the system according to the first example embodiment of the present invention.

On the other hand, when an input port and an output port of the flow are included in the boundary information as a result of confirmation at S201 in FIG. 4 (Yes at S201 in FIG. 4), the layer integration unit 200 adds, to the topology information in the integrated layer information storage unit 302, a virtual link related to the flow and virtual ports necessary for connecting the link (see S202 in FIG. 4, and FIG. 7(*c*)).

Next, the layer integration unit 200 refers to the boundary information and derives ports connected with the input port and the output port of the flow in the lower layer information storage unit 300 stored at Step S200 in FIG. 4. The ports are derived from among the pieces of the topology information in the upper layer information storage unit 301. Then, the layer integration unit 200 stores, as an attribute of the derived ports, the virtual link, and label information and information on virtual ports necessary for using the link (see S203 in FIG. 4, and FIG. 9). Thereafter, the processing ends after passing via Step S204 in FIG. 4. Note that changing the order of the above-described Steps S202, S203, and S204 in FIG. 4 is not a problem. For example, notification of flow addition for the lower layer control information conversion unit 400 may be performed first.

Figure 5:
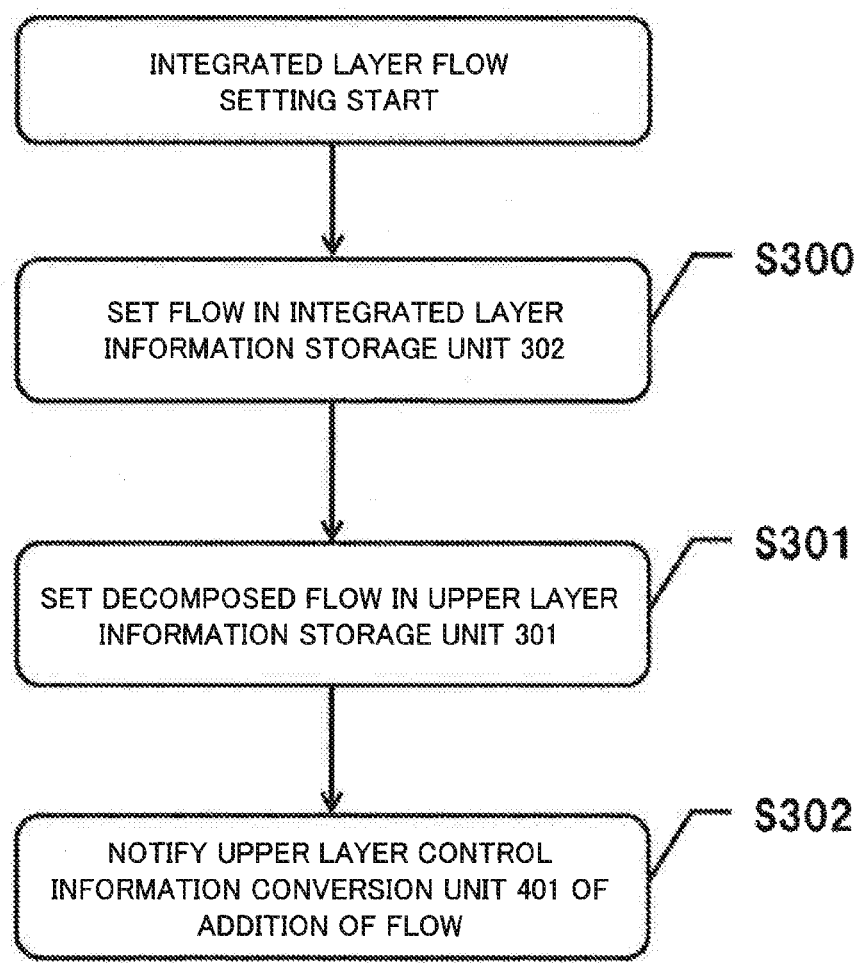
FIG. 5 is a flowchart representing a flow setting operation of an integrated layer performed by the system according to the first example embodiment of the present invention.

Further, the flow is stored in the integrated layer information storage unit 302 (S30 in FIG. 2). First, when the flow is stored in the integrated layer information storage unit 302 (S300 in FIG. 5), the layer integration unit 200 refers to the topology information in the integrated layer information storage unit 302 and extracts a virtual link through which the flow passes. Next, the layer integration unit 200 stores, in the upper layer information storage unit 301, the flow decomposed for use in the upper layer data transfer unit 501 and for use in the upper layer data transfer unit 502 (S301 in FIG. 5). Note that when decomposing the flow for use in the upper layer data transfer unit 501 and for use in the upper layer data transfer unit 502, the input port and the output port are changed by using the boundary information. Next, the upper layer information storage unit 301 notifies the upper layer control information conversion unit 401 of storing of the decomposed flow (S302 in FIG. 5).

Figure 6:
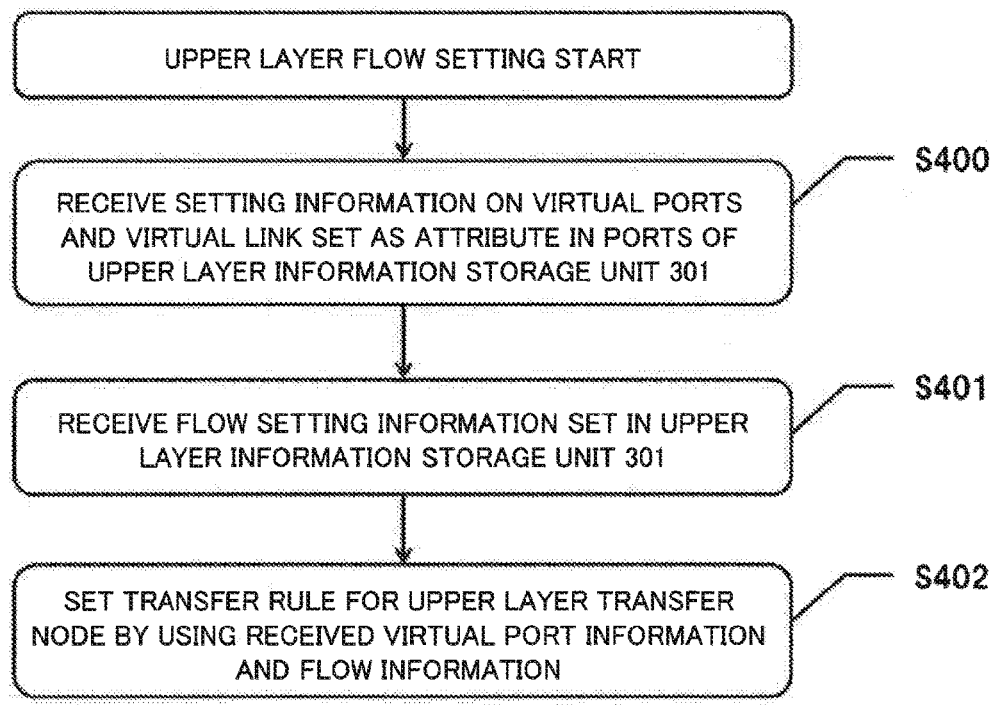
FIG. 6 is a flowchart representing a flow setting operation of an upper layer performed by the system according to the first example embodiment of the present invention.

Finally, the flow is stored in the upper layer in accordance with the notification of the flow storing (S40 in FIG. 2). First, the upper layer control information conversion unit 401 receives, from the upper layer information storage unit 301, setting information (including the label information) on the virtual ports and the virtual link set as an attribute in the ports of the stored flow (S400 in FIG. 6). Next, the upper layer control information conversion unit 401 receives, from the upper layer information storage unit 301, setting information on the flow decomposed at Step S301 in FIG. 5 (S401 in FIG. 6). Finally, the upper layer control information conversion unit 401 generates a transfer rule for an upper layer transfer node by using the label information stored along with the information on the virtual ports and the virtual link and the flow information. The upper layer control information conversion unit 401 then sets the transfer rule in the upper layer data transfer units 501 and 502 (S402 in FIG. 6). As a result of the above, the flow stored in the integrated layer information storage unit 302 is decomposed into two pieces of flow information at the upper layer, and instructions are given to the upper layer data transfer units 501 and 502.

As described above, the present example embodiment is configured as follows. The upper layer control information conversion unit 401 is able to change a label necessary for passing data of the upper layer data transfer units 501 and 502 through a virtual link configured over the lower layer data transfer unit 500. The upper layer control information conversion unit 401 is also able to change a way of assigning the label in accordance with functions of the upper layer data transfer units 501 and 502. The label and the way of assigning the label are changed by using information on virtual ports and a virtual link stored as attribute information of the upper layer information storage unit. This configuration makes it possible to exchange the lower layer data transfer unit 500 and the upper layer data transfer units 501 and 502 with other devices. This exchange can be performed without influencing on a control function of referring to the lower layer information storage unit 300, the upper layer information storage unit 301, and the integrated layer information storage unit 302. In addition, this configuration also results in realizing reduction in development cost of a network control function.

Second Example Embodiment

Now, a second example embodiment configured by replacing the configuration of the above first example embodiment with more specific devices is described. In the following, basic configurations and operations are the same as those in the first example embodiment, therefore, the description will be focused on different points from the first example embodiment.

Figure 8:
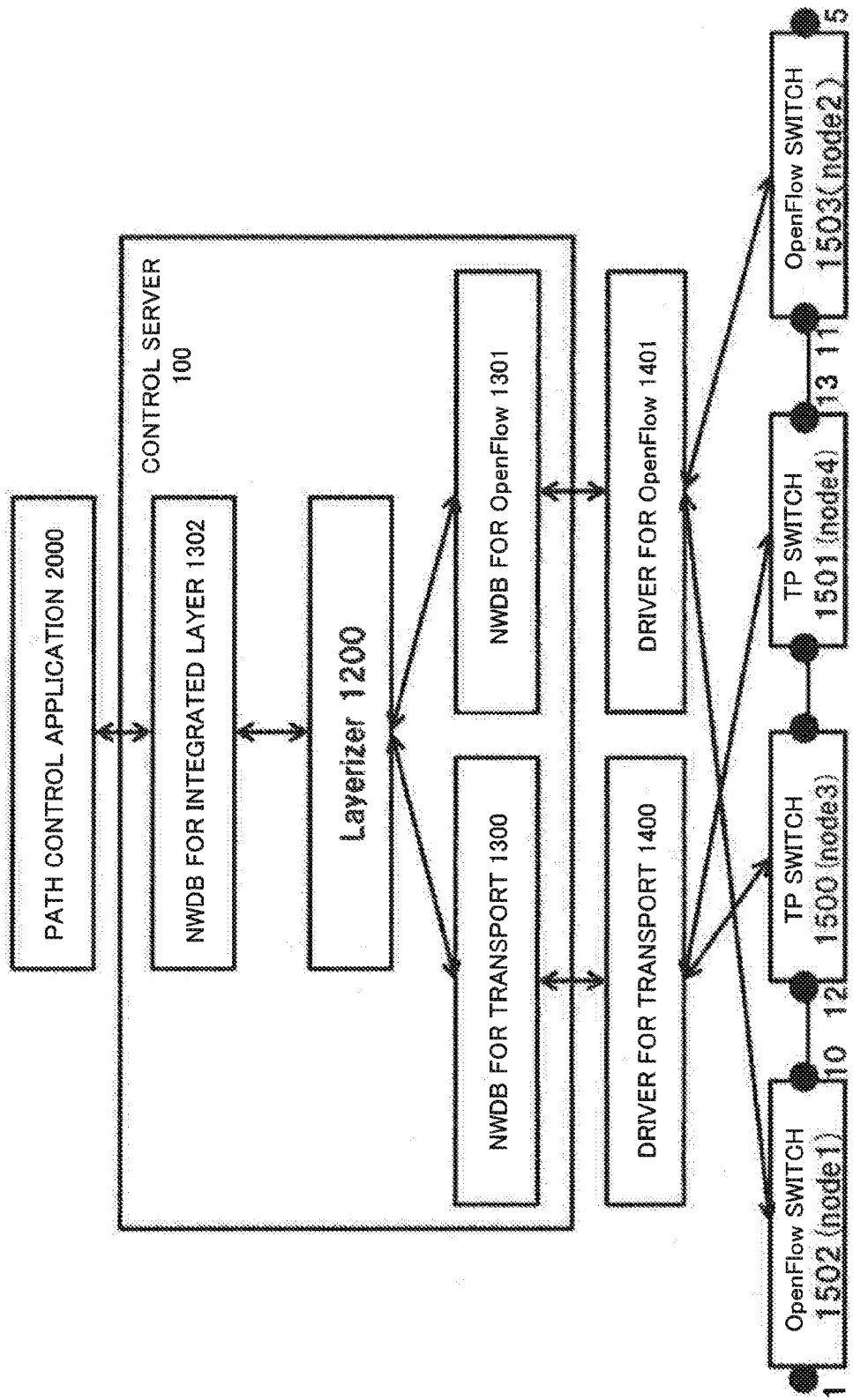
FIG. 8 is a diagram illustrating a configuration of a system according to a second example embodiment of the present invention.

FIG. 8 is a diagram illustrating a configuration of a system according to the second example embodiment of the present invention. Referring to FIG. 8, a configuration is illustrated in which a multistage network including OpenFlow switches 1502 and 1503 equivalent to the upper layer transfer unit in the first example embodiment and transport (TP) switches 1500 and 1501 equivalent to the lower layer transfer unit is connected with a control server 100 that controls the switches. In the present example embodiment, the control server 100 is equivalent to the computer 100A in the above first example embodiment.

A driver for transport 1400 is equivalent to the lower layer control information conversion unit 400 in the first example embodiment. The driver for transport 1400 performs an operation of storing information on a transport network including the transport switches 1500 and 1501 in a network database (NWDB) for transport 1300. Similarly, the driver for transport 1400 controls a transport network based on information updated at the NWDB for transport 1300, the driver for transport 1400 serving as the lower layer control information conversion unit 400.

A driver for OpenFlow 1401 is equivalent to the upper layer control information conversion unit 401 in the first example embodiment. The driver for OpenFlow 1401 performs an operation of storing information on an OpenFlow network including the OpenFlow switches 1502 and 1503 in a network database (NWDB) for OpenFlow 1301. Similarly, the driver for OpenFlow 1401 controls an OpenFlow network based on information updated at the NWDB for OpenFlow 1301.

The NWDB for transport 1300, which is equivalent to the lower layer information storage unit 300 in the first example embodiment, stores network information on a network for transport.

The NWDB for OpenFlow 1301, which is equivalent to the upper layer information storage unit 301 in the first example embodiment, stores network information on a network for OpenFlow.

A layerizer 1200, which is equivalent to the layer integration unit 200 in the first example embodiment, reciprocally exchanges pieces of information in the NWDB for transport 1300 and the NWDB for OpenFlow 1301 with information in a NWDB for integrated layer 1302. Specifically, the layerizer 1200 integrates information in the NWDB for transport 1300 with information in the NWDB for OpenFlow 1301 and updates network information in the NWDB for integrated layer 1302. In addition, the layerizer 1200 updates, upon transfer of the NWDB for integrated layer 1302, the NWDB for transport 1300 or the NWDB for OpenFlow 1301 in accordance with a processing of the transfer.

The NWDB for integrated layer 1302 is equivalent to the integrated layer information storage unit 302 in the first example embodiment. The NWDB for integrated layer 1302 stores network information of an integrated layer created by integrating network information on a network for OpenFlow with flow information on a network for transport as a virtual link.

A path control application 2000 is an application for referring to and updating the NWDB for integrated layer 1302. Note that the path control application 2000 may be an application program running on the control server 100, or may be an application program running on a terminal or the like capable of accessing to the NWDB for integrated layer 1302. The path control application 2000 also functions as means of externally accepting flow storing with use of a virtual link on an integrated layer by being provided with data in the NWDB for integrated layer 1302. Of course, the path control application 2000 may be added with other network management functions.

Figure 9:
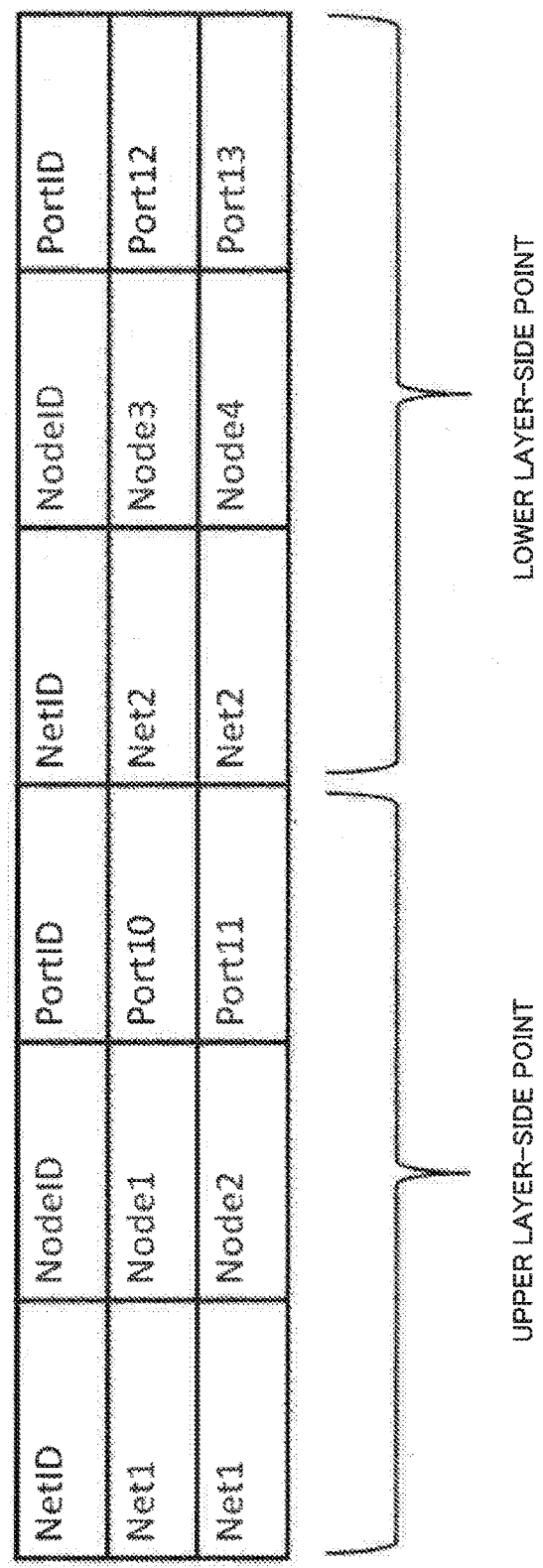
FIG. 9 is a diagram illustrating an example of boundary information for use in the second example embodiment of the present invention.

FIG. 9 is an example of boundary information stored by the layerizer 1200 according to the present example embodiment. In the example of FIG. 9, boundary information is constituted of network IDs (NetIDs) each indicating a NWDB for transport or a NWDB for OpenFlow and pairs of IDs of nodes and ports included in the NWDB for transport or the NWDB for OpenFlow. When the information is stored, ports of OpenFlow switches on topology stored in the NWDB for integrated layer 1302, included in the information, are deleted, as described at S101 in FIG. 3. For example, when the boundary information in FIG. 9 is stored, Port 10 of the OpenFlow switch 1502 and Port 11 of the OpenFlow switch 1503 in FIG. 8 are deleted.

FIG. 10 indicates virtual ports and label information (an example of attribute information) of virtual links stored in ports of a NWDB for OpenFlow. The information is constructed with the boundary information by the layerizer 1200 when a flow is stored in a NWDB for transport. In the example of FIG. 10, Port 10 of Node 1 (the OpenFlow switch 1502 in FIG. 8) relates to Virtual Port #2 (virtual port ID=Vport2), and a value 10 is set as a Virtual Local Area Network (VLAN).

By using the information as a label value in a matching condition and a packet rewrite action, the driver for OpenFlow 1401 generates a transfer rule to be set in the OpenFlow switches 1502 and 1503. For example, the driver for OpenFlow 1401 creates such a transfer rule that assigns VLAN ID=10 to a packet to be output from Port 10 of Node 1 (the OpenFlow switch 1502 in FIG. 8) to Virtual Port #2 (virtual port ID=Vport2). In addition, according to FIG. 10, an identical port of an identical switch having a different destination virtual port may be assigned with a different label. For example, the driver for OpenFlow 1401 creates such a transfer rule that assigns Multi Protocol Label Switching (MPLS) label=100 to a packet to be output from Port 10 of Node 1 (the OpenFlow switch 1502 in FIG. 8) to Virtual Port #4 (virtual port ID=Vport4).

FIG. 11 indicates flow information stored in the NWDB for integrated layer 1302 by the path control application 2000 and flow information obtained by decomposing the flow information for use in Node 1 and Node 2 by the layerizer 1200. For example, as illustrated in FIG. 11, assume that flow information is stored in the NWDB for integrated layer 1302 as follows. A packet received from Port 1 of Node 1 (the OpenFlow switch 1502 in FIG. 8) (in other words, a "Match" condition in FIG. 11) is output from Port 5 of Node 2 (the OpenFlow switch 1503 in FIG. 8) via a virtual link (#10, for example) (in other words, an "Action" condition in FIG. 11). In the example of FIG. 11, the layerizer 1200 decomposes the flow, and creates, for Node 1, flow information (the OpenFlow switch 1502 in FIG. 8) that causes a packet received from Port 1 (in other words, a "Match" condition of Entry #1 in the lower column of FIG. 11) to be output from Virtual Port #2 (a virtual port associated with Port 10 in FIGS. 8 and 10). Similarly, the layerizer 1200 creates, for Node 2, flow information (the OpenFlow switch 1503 in FIG. 8) that causes a packet received from Virtual Port #6 (a virtual port associated with Port 11 in FIGS. 8 and 10) (in other words, a "Match" condition of Entry #2 in the lower column of FIG. 11) to be output from Port 5.

FIG. 12 indicates transfer rules set for Node 1 (the OpenFlow switch 1502 in FIG. 8) and Node 2 (the OpenFlow switch 1503 in FIG. 8) by the driver for OpenFlow 1401 based on flow information in FIG. 11. For example, an entry of Node 1; Table 1 in FIG. 12 specifies that a packet received from Port 1 is attached with a value "10" in Metadata region, and then jump to (Goto) Table 2. Then, an entry of Node 1; Table 2 in FIG. 12 specifies that a packet with a value "10" set in Metadata region is attached with a VLAN ID=10 and is output from Virtual Port #10. In this way, a transfer rule related to flow information for Entry #1 in the lower column of FIG. 11 is created. Similarly, an entry of Node 2; Table 1 in FIG. 12 specifies that a packet with a VLAN ID=10 received from Virtual Port #11 is attached with a value "10" in Metadata region, and then jump to (Goto) Table 2. Then, an entry of Node 2; Table 2 in FIG. 12 specifies that a packet with a value "10" set in Metadata region has a VLAN ID detached and then is output from Port 5.

Note that the example of FIG. 12 illustrates a transfer rule (flow entry) assuming that the Multiple Table function prescribed in OpenFlow version 1.1 or later is available. In this example, an entry in Table 2 may be generated at a point of time when label information of virtual links and virtual ports are stored in the ports of the NWDB for OpenFlow 1301, for example. In addition, when the Multiple Table function is unavailable, the similar processing may be achieved by a plurality of actions with respect to a single flow.

In the above, each of the example embodiments of the present invention has been described. However, the present invention is not limited to the above-described example embodiments, but can be further modified, substituted, and adjusted within a scope not departing from the basic technical concept of the present invention. For example, the network configuration, the configuration of elements, the table configuration, and the like illustrated in each of the drawings are examples for aiding the understanding of the present invention, and are not limited to the configurations illustrated in the drawings.

Finally, preferred modes of the present invention are summarized.

[First Mode]

(See the network control system according to the first viewpoint)

[Second Mode]

The network control system according to the first mode, wherein the layer integration unit confirms, upon storing of information on a flow representing point-to-point communication of the lower layer in the lower layer information storage unit, whether or not an endpoint of the flow is included in boundary information including a set of ports being at a boundary between network topology stored in the lower layer information storage unit and network topology stored in the upper layer information storage unit, designated in advance, generates, when an endpoint of the flow is included in the boundary information, a virtual link related to the flow and virtual ports for the virtual link, and stores the virtual link and the virtual ports in integrated layer network information stored in the integrated layer information storage unit, and further, assigns the label information as attribute information of ports of the upper layer to a corresponding entry in the upper layer information storage unit.

[Third Mode]

The network control system according to the second mode, wherein a plurality of sets of ports between the lower layer and an upper layer existing across the lower layer can be designated as the boundary information, further, when a flow is stored in the integrated layer information storage unit with use of the virtual link, the layer integration unit decomposes the flow for an upper layer based on the boundary information, and notifies the upper layer control information conversion unit of occurrence of the flow, and the upper layer control information conversion unit receiving the notification updates settings and statuses of the upper layer data transfer units using the assigned label information to transfer the decomposed flow, and updates network information in the upper layer information storage unit.

[Fourth Mode]

The network control system according to any one of the first to third modes, wherein the upper layer data transfer units are configured by centralized control-type network switches, and the lower layer data transfer unit is configured by a second switch intervening between the centralized control-type network switches.

[Fifth Mode]

The network control system according to any one of the first to fourth modes, wherein storing of a flow with use of the virtual link is externally accepted by being provided with information stored in the integrated layer information storage unit.

[Sixth Mode]

(See the control device according to the second viewpoint)

[Seventh Mode]

(See the network information management method according to the third viewpoint)

[Eighth Mode]

(See the program according to the fourth viewpoint)

Note that the sixth to eighth modes can be developed into the second to fifth modes in the same manner as the first mode.

Note that the disclosure of each of PTLs listed above is incorporated herein by reference. The example embodiments or examples can be changed and adjusted within the scope of the entire disclosure (including the claims) of the present invention, and further, based on the basic technical concept of the present invention. In addition, various disclosed elements (including the elements in each of the claims, the elements in each of the example embodiments or the examples, the elements in each of the drawings, and the like) can be combined or selected in various ways within the scope of the disclosure of the present invention. In other words, it goes without saying that the present invention includes various modifications and corrections that can be made by a person skilled in the art in accordance with the entire disclosure including the claims and the technical concept. In particular, with regard to ranges of numerical values described herein, arbitrary numerical values or subranges included within the ranges should be interpreted as being specifically described even when not otherwise described.

INDUSTRIAL APPLICABILITY

The present invention is also applicable to uses such as development of a network control algorithm independent from various multistage network configurations.

REFERENCE SIGNS LIST

100 Control server
100A Computer
200 Layer integration unit
300 Lower layer information storage unit
301 Upper layer information storage unit
302 Integrated layer information storage unit
400 Lower layer control information conversion unit
401 Upper layer control information conversion unit
500 Lower layer data transfer unit
501, 502 Upper layer data transfer unit
1200 Layerizer
1300 NWDB for transport
1301 NWDB for OpenFlow
1302 NWDB for integrated layer
1400 Driver for transport
1401 Driver for OpenFlow
1500, 1501 Transport (TP) switch
1502, 1503 OpenFlow switch
2000 Path control application

The invention claimed is:

1. A network control system comprising:
one or more processors forming a lower layer data transfer unit configured to perform communication of a lower layer;
one or more memories forming a lower layer information storage unit configured to store network information of the lower layer;
one or more processors forming a lower layer control information conversion unit configured to update, based on network information in the lower layer information storage unit and a setting and a status of the lower layer data transfer unit, network information in the lower layer information storage unit and a setting and a status of the lower layer data transfer unit;
one or more processors forming an upper layer data transfer unit configured to perform communication of an upper layer;
one or more memories forming an upper layer information storage unit configured to store network information of the upper layer;
one or more processors forming an upper layer control information conversion unit configured to update, based on network information in the upper layer information storage unit and a setting and a status of a switch for an upper layer, network information in the upper layer information storage unit and a setting and a status of the upper layer data transfer unit;
one or more memories forming an integrated layer information storage unit configured to store network information of an integrated layer obtained by integrating network information of the lower layer with network information of the upper layer; and
one or more processors forming a layer integration unit configured to configure network information of the integrated layer by integrating network information of the upper layer with information on a flow representing point-to-point communication of the lower layer as a virtual link, and perform reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer.

2. The network control system according to claim 1, wherein
the layer integration unit is configured to:
confirm, upon storing of information on a flow representing point-to-point communication of the lower layer in the lower layer information storage unit, whether or not an endpoint of the flow is included in boundary information including a set of ports being at a boundary between network topology stored in the lower layer information storage unit and network topology stored in the upper layer information storage unit, designated in advance,
generate, when an endpoint of the flow is included in the boundary information, a virtual link related to the flow and a virtual port for the virtual link, and stores the virtual link and the virtual port in integrated layer network information stored in the integrated layer information storage unit, and
further, assign the label information as attribute information of a port of the upper layer to a corresponding entry in the upper layer information storage unit.

3. The network control system according to claim 1, wherein
the upper layer data transfer unit is configured by a centralized control-type network switch, and
the lower layer data transfer unit is configured by a second switch intervening between the centralized control-type network switches.

4. The network control system according to claim 2, wherein
a plurality of sets of ports between the lower layer and an upper layer existing across the lower layer can be designated as the boundary information,
further, when a flow is stored in the integrated layer information storage unit with use of the virtual link, the layer integration unit decomposes a flow for an upper layer, based on the boundary information, and notifies the upper layer control information conversion unit of occurrence of a flow, and
the upper layer control information conversion unit receiving the notification updates a setting and a status of the upper layer data transfer units by using the assigned label information to transfer the decomposed flow, and updates network information in the upper layer information storage unit.

5. The network control system according to claim 2, wherein
the upper layer data transfer unit is configured by a centralized control-type network switch, and
the lower layer data transfer unit is configured by a second switch intervening between the centralized control-type network switches.

6. The network control system according to claim 4, wherein
the upper layer data transfer unit is configured by a centralized control-type network switch, and
the lower layer data transfer unit is configured by a second switch intervening between the centralized control-type network switches.

7. A control device connected with a lower layer data transfer unit that performs communication of a lower layer and an upper layer data transfer unit that performs communication of an upper layer, comprising:
one or more processors forming a lower layer data transfer unit configured to perform communication of the lower layer;
one or more memories forming a lower layer information storage unit configured to store network information of the lower layer;
one or more processors forming a lower layer control information conversion unit configured to update, based on network information in the lower layer information storage unit and a setting and a status of the lower layer data transfer unit, network information in the lower layer information storage unit and a setting and a status of the lower layer data transfer unit;
one or more processors forming an upper layer data transfer unit configured to perform communication of the upper layer;
one or more memories forming an upper layer information storage unit that stores network information of the upper layer;
one or more processors forming an upper layer control information conversion unit configured to update, based on network information in the upper layer information storage unit and a setting and a status of a switch for an upper layer, network information in the upper layer information storage unit and a setting and a status of the upper layer data transfer unit;
one or more memories forming an integrated layer information storage unit configured to store network information of an integrated layer obtained by integrating network information of the lower layer with network information of the upper layer; and
one or more processors forming a layer integration unit configured to configure network information of the integrated layer by integrating network information of the upper layer with information on a flow representing point-to-point communication of the lower layer as a virtual link, and perform reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer.

8. The control device according to claim 7, wherein the layer integration unit is configured to:
confirm, upon storing of information on a flow representing point-to-point communication of the lower layer in the lower layer information storage unit, whether or not an endpoint of the flow is included in boundary information including a set of ports being at a boundary between network topology stored in the lower layer information storage unit and network topology stored in the upper layer information storage unit, designated in advance,
generate, when an endpoint of the flow is included in the boundary information, a virtual link related to the flow and a virtual port for the virtual link, and store the virtual link and the virtual port in integrated layer network information stored in the integrated layer information storage unit, and
further, assign the label information as attribute information of a port of the upper layer to a corresponding entry in the upper layer information storage unit.

9. The control device according to claim 7, wherein
the upper layer data transfer unit is configured by a centralized control-type network switch, and
the lower layer data transfer unit is configured by a second switch intervening between the centralized control-type network switches.

10. The control device according to claim 7, wherein
storing of a flow with use of the virtual link is externally accepted by being provided with information stored in the integrated layer information storage unit.

11. The control device according to claim 8, wherein
a plurality of sets of ports between the lower layer and an upper layer existing across the lower layer can be designated as the boundary information,
further, when a flow is stored in the integrated layer information storage unit with use of the virtual link, the layer integration unit is configured to decompose a flow for an upper layer, based on the boundary information, and notify the upper layer control information conversion unit of occurrence of a flow, and
the upper layer control information conversion unit receiving the notification is configured to update a setting and a status of the upper layer data transfer units by using the assigned label information to transfer the decomposed flow, and update network information in the upper layer information storage unit.

12. The control device according to claim 8, wherein
the upper layer data transfer unit is configured by a centralized control-type network switch, and
the lower layer data transfer unit is configured by a second switch intervening between the centralized control-type network switches.

13. The control device according to claim 8, wherein storing of a flow with use of the virtual link is externally accepted by being provided with information stored in the integrated layer information storage unit.

14. The control device according to claim 9, wherein storing of a flow with use of the virtual link is externally accepted by being provided with information stored in the integrated layer information storage unit.

15. The control device according to claim 11, wherein the upper layer data transfer unit is configured by a centralized control-type network switch, and the lower layer data transfer unit is configured by a second switch intervening between the centralized control-type network switches.

16. The control device according to claim 11, wherein storing of a flow with use of the virtual link is externally accepted by being provided with information stored in the integrated layer information storage unit.

17. A network information management method, by a control device connected with a lower layer data transfer unit that performs communication of a lower layer and an upper layer data transfer unit that performs communication of an upper layer, the control device including:
one or more memories forming a lower layer information storage unit that stores network information of the lower layer;
one or more processors forming a lower layer control information conversion unit configured to update, based on network information in the lower layer information storage unit and a setting and a status of the lower layer data transfer unit, network information in the lower layer information storage unit and a setting and a status of the lower layer data transfer unit;
one or more memories forming an upper layer information storage unit configured to store network information of the upper layer;
one or more processors forming an upper layer control information conversion unit configured to update, based on network information in the upper layer information storage unit and a setting and a status of a switch for an upper layer, network information in the upper layer information storage unit and a setting and a status of the upper layer data transfer unit; and
one or more memories forming an integrated layer information storage unit configured to store network information of an integrated layer obtained by integrating network information of the lower layer with network information of the upper layer, comprising:
configuring network information of the integrated layer by integrating network information of the upper layer with information on a flow representing point-to-point communication of the lower layer as a virtual link; and
performing reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer.

18. A non-transitory computer readable storage medium storing a program executed by control device, configured by a computer, connected with a lower layer data transfer unit that performs communication of a lower layer and an upper layer data transfer unit that performs communication of an upper layer, the computer comprising:
one or more memories forming a lower layer information storage unit that stores network information of the lower layer;
one or more processors forming a lower layer control information conversion unit configured to update, based on network information in the lower layer information storage unit and a setting and a status of the lower layer data transfer unit, network information in the lower layer information storage unit and a setting and a status of the lower layer data transfer unit;
one or more memories forming an upper layer information storage unit configured to store network information of the upper layer;
one or more processors forming an upper layer control information conversion unit configured to update, based on network information in the upper layer information storage unit and a setting and a status of a switch for an upper layer, network information in the upper layer information storage unit and a setting and a status of the upper layer data transfer unit; and
one or more memories forming an integrated layer information storage unit configured to store network information of an integrated layer obtained by integrating network information of the lower layer with network information of the upper layer, comprising:
configuring network information of the integrated layer by integrating network information of the upper layer with information on a flow representing point-to-point communication of the lower layer as a virtual link; and
performing reciprocal exchange of network information in the integrated layer information storage unit, in the lower layer information storage unit, and in the upper layer information storage unit, the reciprocal exchange including processing of assigning, as attribute information of a port of an upper layer, label information necessary for using a virtual link provided by a lower layer.

* * * * *